United States Patent
Ishida

(10) Patent No.: US 9,366,278 B2
(45) Date of Patent: Jun. 14, 2016

(54) MALE FASTENING TOOL

(75) Inventor: Rikiya Ishida, Seki (JP)

(73) Assignee: MEIRA CORPORATION, Nagoya-shi, Aichi (JP)

( * ) Notice: Subject to any disclaimer, the term of this patent is extended or adjusted under 35 U.S.C. 154(b) by 229 days.

(21) Appl. No.: 13/242,933

(22) Filed: Sep. 23, 2011

(65) Prior Publication Data

US 2012/0076613 A1   Mar. 29, 2012

(30) Foreign Application Priority Data

Sep. 27, 2010 (JP) ................................ 2010-215887

(51) Int. Cl.
*F16B 33/00* (2006.01)
*F16B 11/00* (2006.01)
*F16L 55/11* (2006.01)
*F16B 37/14* (2006.01)

(52) U.S. Cl.
CPC ............. *F16B 11/006* (2013.01); *F16B 33/004* (2013.01); *F16L 55/1108* (2013.01); *F16B 37/14* (2013.01)

(58) Field of Classification Search
CPC .... F16L 55/1108; F16B 33/004; F16B 37/14; F16B 43/001; F16B 19/008; F16B 11/006; Y10S 411/908; Y10S 411/947
USPC ........... 411/337, 371.1, 371.2, 542, 908, 369, 411/383
See application file for complete search history.

(56) References Cited

U.S. PATENT DOCUMENTS

| | | | | |
|---|---|---|---|---|
| 951,437 A | * | 3/1910 | Gehrke | 220/304 |
| 1,995,705 A | * | 3/1935 | Deniston, Jr. | 411/371.1 |
| 2,752,814 A | * | 7/1956 | Iaia | 411/542 |
| 2,760,400 A | * | 8/1956 | Mills et al. | 411/371.1 |
| 3,149,850 A | * | 9/1964 | Fischer | 411/542 |
| 3,175,454 A | * | 3/1965 | Morse | 411/542 |
| 3,241,422 A | * | 3/1966 | Heimovics | 411/371.1 |
| 3,247,752 A | * | 4/1966 | Greenleaf et al. | 411/542 |
| 3,399,589 A | * | 9/1968 | Breed | 411/428 |
| 3,520,342 A | * | 7/1970 | Scheffer | 411/303 |
| 3,557,654 A | * | 1/1971 | Weidner, Jr. | 411/396 |
| 3,618,444 A | * | 11/1971 | Kay et al. | 411/373 |
| 4,033,243 A | * | 7/1977 | Kirrish et al. | 411/338 |
| 4,310,273 A | * | 1/1982 | Kirrish | 411/338 |

(Continued)

FOREIGN PATENT DOCUMENTS

| | | |
|---|---|---|
| JP | 2-050328 B | 11/1990 |
| WO | WO 2008/010523 A1 | 1/2008 |

*Primary Examiner* — Flemming Saether
(74) *Attorney, Agent, or Firm* — Buchanan Ingersoll & Rooney P.C.

(57) ABSTRACT

A male fastening tool body includes a body part, a flange part which has a seat surface, an annular concave part formed between the body part and the seat surface, and a resinous ring-shaped member disposed at the annular concave part. The annular concave part has an annular concave peripheral edge portion. The resinous ring-shaped member has an annular projected part which fills almost the entire annular concave part and a lower surface of which is projected downward beyond the seat surface and an annular peripheral part, having a tapered bottom surface or a curved bottom surface, which is formed between the annular projected part and the outer edge of the resinous ring-shaped member and becomes gradually thinner, with an outer edge of the resinous ring-shaped member being located at an outer edge of the annular concave peripheral edge portion or slightly toward the side of the body part.

13 Claims, 11 Drawing Sheets

(56) References Cited

U.S. PATENT DOCUMENTS

| | | | |
|---|---|---|---|
| 4,701,088 A * | 10/1987 | Crull | 411/369 |
| 4,749,321 A * | 6/1988 | Knohl et al. | 411/371.1 |
| 4,875,818 A * | 10/1989 | Reinwall | 411/369 |
| 5,006,026 A * | 4/1991 | Estrada | 411/369 |
| 5,188,495 A * | 2/1993 | Jones, Jr. | 411/369 |
| 5,957,641 A * | 9/1999 | Bogatz et al. | 411/43 |
| 6,231,286 B1 * | 5/2001 | Bogatz et al. | 411/371.1 |
| 6,244,807 B1 * | 6/2001 | Garcia | 411/369 |
| 6,764,262 B1 * | 7/2004 | Hargis | 411/371.1 |
| 7,166,668 B2 * | 1/2007 | Symons | 524/539 |
| 7,740,433 B2 * | 6/2010 | Miyoshi et al. | 411/371.1 |
| 8,186,921 B2 * | 5/2012 | Lowman | 411/371.1 |
| 2008/0135335 A1 * | 6/2008 | Lowman | 184/1.5 |
| 2010/0003106 A1 | 1/2010 | Ishida et al. | |

\* cited by examiner

MALE FASTENING TOOL

BACKGROUND OF THE INVENTION

The present invention relates to a male fastening tool to be used to fasten a member to a portion where a sealing property is demanded.

Various members are fixed to portions respectively where they are to be fastened by using a fastening tool such as a bolt, a nut, a plug, and the like. In dependence on a portion, it is necessary to fasten a member with preferable sealing performance against leak of water and oil.

To fasten the member to the portion where preferable sealing performance is demanded, a sealing ring such as a rubber ring is used in combination with a metal washer ring at the portion where the preferable sealing performance is demanded. But the use of such rings may thicken the portion to which the member should be fastened with preferable sealing performance and may cause defective sealing to occur owing to deviation of the sealing ring.

To overcome this problem, many fastening tools (for example, bolt) having sealing performance have been proposed. In the bolt disclosed in JPB1990-50328 2-50328, patent document 1), the annular groove part having the approximately semicircular cross section is concavely formed on the peripheral surface of the neck part disposed on the lower surface of the bolt head. There is provided the packing material having the integrally formed annular tongue edge part having the approximately triangular cross section. The annular tongue edge part can be filled in the filling part formed from the lower surface of the annular packing member fitted in the annular groove part to the open edge of the bolt hole. A member is fixed to the bolt hole by means of the annular groove part in cooperation with the packing member. Inside the annular groove part, there is provided the neck part-sealing part having the annular projected convexity projected inward or the annular concavity concaved outward.

The present applicant proposed the bolt as disclosed in WO2008/10523 (patent document 2). The bolt 1 of the patent document 2 has the bolt body 2 including the screw part 5, the head part 6 formed at the upper end of the screw part 5, and the flange part 7 formed at the lower end of the head part 6; and the unconductive resinous ring-shaped member 3 covering the peripheral portion of the flange part 7. The flange part 7 has the disk-shaped flange body portion 71 and the seat surface-forming portion 72 having the seat surface 73 which is extended toward the screw part from the lower surface of the flange body portion 71, has a smaller diameter than that of the flange body portion 71, and is pressed against the portion where the bolt is to be mounted. The resinous ring-shaped member 3 has the edge part 31 which is located at the position nearer to the lower end of the screw part 5 than the seat surface 73 and outward from the flange body portion 7 and the annular skirt part 32 whose diameter gradually increases to the edge part 31. The annular skirt part 32 deforms when the bolt is mounted on the portion where the bolt is to be mounted, does not restrain the seat surface 73 from being pressed against the portion where the bolt is to be mounted, and forms the annular liquid-tight sealing portion for the portion where the bolt is to be mounted. The bolt of WO2008/10523 invention is especially effective for preventing the occurrence of electrolytic corrosion.

The bolt disclosed in the patent document 1 has an effect to some extent, but is demanded to have higher liquid-tight sealing performance. The bolt disclosed in the patent document 2 has sufficient sealing performance, but the unconductive resinous ring-shaped member projects beyond the bolt body. Thus the entire head part is large and portions where the bolt can be used are limited to specific portions.

Therefore it is an object of the present invention to provide a male fastening tool which is not large and is capable of imparting sufficient liquid-tight sealing performance to a portion to which a member is to be fastened.

SUMMARY OF THE INVENTION

The above-described object is achieved by a male fastening tool.

A male fastening tool comprises a male fastening tool body essentially including a body part having a male screw portion formed thereon, a flange part which is formed on an upper end of said body part and has a seat surface, to be pressed against a portion on which said male fastening tool is to be mounted, which is disposed on a periphery of a lower surface thereof, and an annular concave part formed between said body part and said seat surface of said flange part; and a resinous ring-shaped member disposed at said annular concave part of said male fastening tool body, wherein said annular concave part of said male fastening tool body further comprises an annular concave peripheral edge portion which becomes gradually shallower toward said seat surface; and an outer edge of said resinous ring-shaped member is located at an outer edge of said annular concave peripheral edge portion of said annular concave part or slightly toward a side of said body part with respect to said outer edge of said annular concave peripheral edge portion; said resinous ring-shaped member has an annular projected part which fills almost an entirety of said annular concave part and a lower surface of which is projected downward beyond said seat surface and an annular peripheral part, having a tapered bottom surface or a curved bottom surface, which is formed between said annular projected part and said outer edge of said resinous ring-shaped member and becomes gradually thinner; wherein said resinous ring-shaped member deforms when said male fastening tool is mounted on said portion on which said male fastening tool is to be mounted, does not restrain said seat surface from being pressed against said portion on which said male fastening tool is to be mounted, and forms an annular liquid-tight sealing portion for said portion on which said male fastening tool is to be mounted.

DETAILED DESCRIPTION OF PREFERRED EMBODIMENTS

Figure 1:
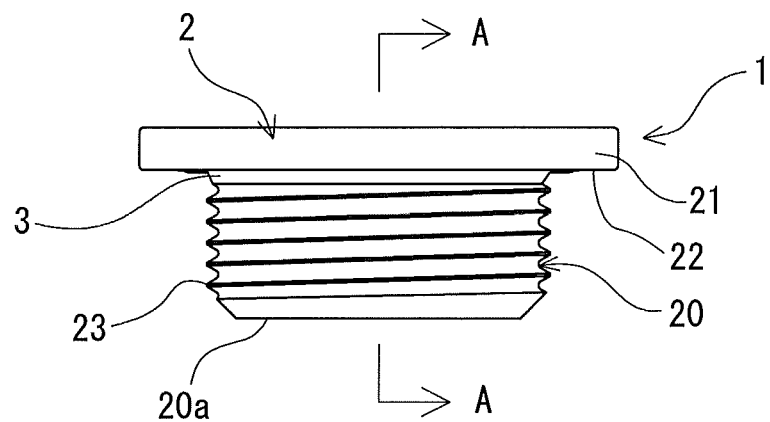
FIG. 1 is a front view of an embodiment in which the male fastening tool of the present invention is applied to a sealing plug.
Figure 2:
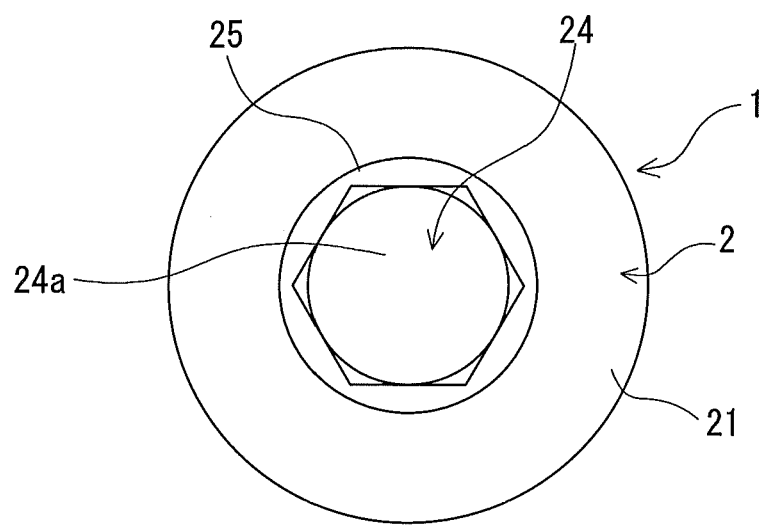
FIG. 2 is a plan view of the male fastening tool shown in FIG. 1.

Embodiments of the male fastening tool of the present invention are described below with reference to the drawings.

A male fastening tool 1 of the present invention is composed of a male fastening tool body 2 essentially including a body part 20 having a male screw portion 23 formed thereon, a flange part 21 which is formed on an upper end of the body part 20 and has a seat surface 22, to be pressed against a portion on which the male fastening tool 1 is to be mounted, which is disposed on a periphery of a lower surface thereof, and an annular concave part 27 formed between the body part 20 and the seat surface 22 of the flange part 21; and a resinous ring-shaped member 3 disposed at the annular concave part 27 of the male fastening tool body 2. The annular concave part 27 of the male fastening tool body 2 has an annular concave peripheral edge portion 29 which becomes gradually shallower toward the seat surface. The resinous ring-shaped member 3 has an annular projected part 31 which fills almost the entire annular concave part 27 and a lower surface of which is projected downward beyond the seat surface and an annular peripheral part 35, having a tapered bottom surface or a curved bottom surface, which is formed between the annular projected part 31 and the outer edge 33 of the resinous ring-shaped member 3 and becomes gradually thinner, with an outer edge 33 of the resinous ring-shaped member 3 being located at an outer edge of the annular concave peripheral edge portion 29 of the annular concave part 27 or slightly toward the side of the body part 20 with respect to the outer edge of the annular concave peripheral edge portion 29. The male fastening tool 1 has an annular concave part 34 formed between an inner edge 22a of the seat surface 22 and the outer edge 33 of the resinous ring-shaped member 3. The resinous ring-shaped member 3 deforms when the male fastening tool 1 is mounted on the portion on which the male fastening tool 1 is to be mounted, does not restrain the seat surface 22 from being pressed against the portion on which the male fastening tool 1 is to be mounted, and forms an annular liquid-tight sealing portion for the portion on which the male fastening tool 1 is to be mounted.

FIGS. 1 through 7 show an embodiment in which the male fastening tool 1 of the present invention is applied to a sealing plug.

The male fastening tool (sealing plug) 1 of the present invention is composed of the male fastening tool body (sealing plug body) 2 and the resinous ring-shaped member 3 disposed at the annular concave part 27 of the male fastening tool body 2. The sealing plug of this embodiment displays a sealing effect as soon as a fastening work finishes. The sealing plug is capable of holding an axial force as much as ordinary sealing plugs do and displaying the sealing effect at a low torque (axial force). Further the sealing plug of the present invention eliminates the need for incorporating a washer, an O-ring, and the like in the male fastening tool body. Thus the use of the male fastening tool facilitates a fastening work.

The sealing plug body 2 has the body part 20 having the male screw portion 23 formed thereon, the flange part 21 which is formed on the upper end of the body part 20 and has the seat surface 22 to be pressed against the portion on which the sealing plug body 2 is to be mounted on the periphery of the lower surface thereof, and the annular concave part 27 formed between the body part 20 and the seat surface 22 of the flange part 21.

The male fastening tool body 2 is made of an iron-based steel material such as high-tensile strength steel or stainless steel. As shown in FIGS. 1 through 7, the male fastening tool body (sealing plug body) 2 has the body part 20 having the male screw portion 23 formed on the outer surface thereof and the flange part 21 which is formed on the upper end of the body part 20 and has a diameter larger than that of the body part 20.

Figure 3:
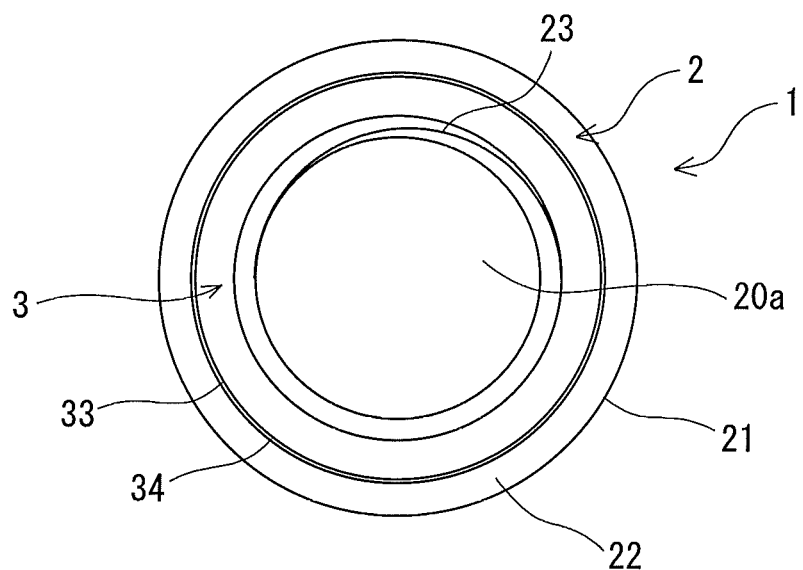
FIG. 3 is a bottom view of the male fastening tool shown in FIG. 1.
Figure 4:
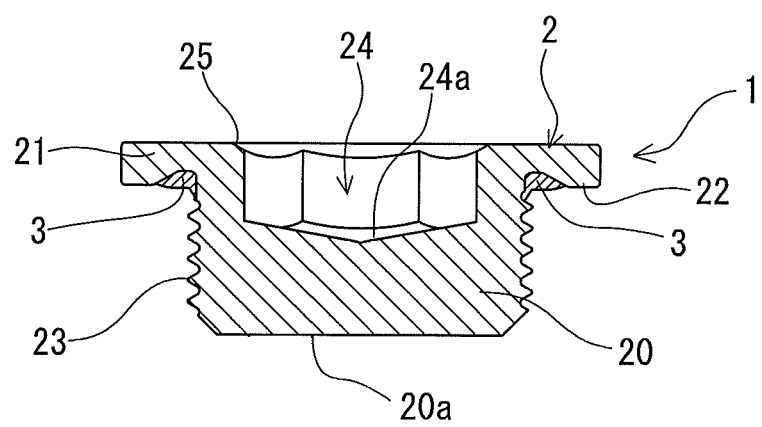
FIG. 4 is a sectional view taken along a line A-A of FIG. 1.
Figure 5:
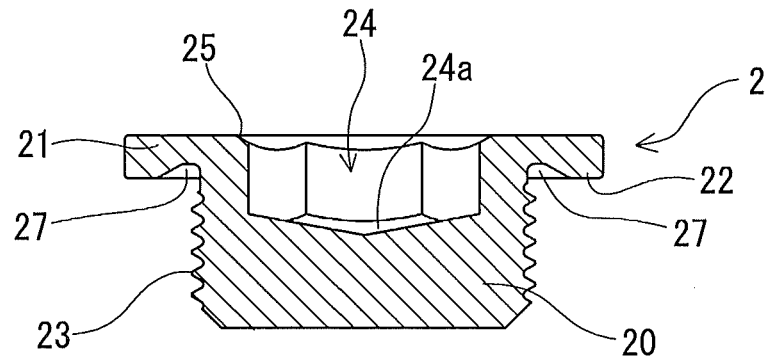
FIG. 5 is a sectional view of a male fastening tool body used for the male fastening tool of the embodiment shown in FIG. 1.

In this embodiment, the body part 20 is columnar or cylindrical and has a predetermined length comparatively short. The male screw portion 23 is formed on the entire peripheral surface of the body part 20. The male screw portion 23 may be formed on only a part (for example, the lower end) of the body part 20. As shown in FIGS. 3 through 5, a bottom surface 20a of the body part 20 is closed and formed as a flat surface.

The flange part 21 is disk-shaped and extended radially from the upper end of the body part 20. The annular seat surface 22 is formed on the bottom surface of the flange part 21. The seat surface 22 is formed as an annular flat portion and capable of holding a predetermined axial force when the male fastening tool 1 is mounted on the portion on which the male fastening tool 1 is to be mounted. The disk-shaped flange part 21 has a substantially equal outer diameter. The flange part 21 is concentric with the body part 20 (the flange part 21 and the body part 20 have the same axis).

Figure 6:
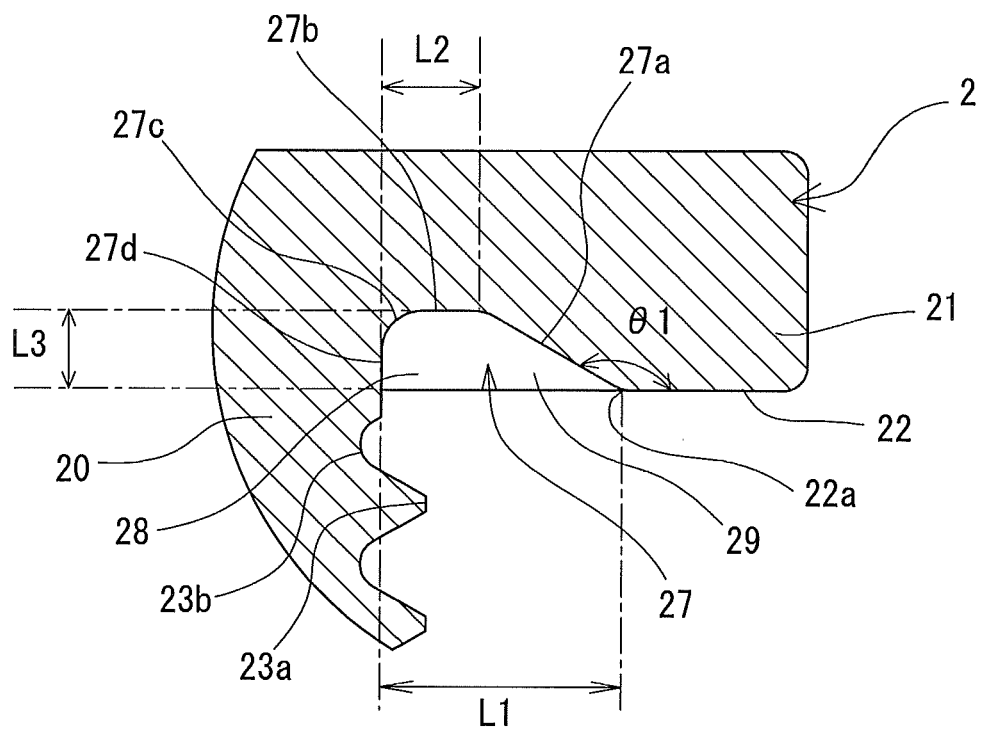
FIG. 6 is a partly enlarged sectional view of the male fastening tool body used for the male fastening tool of the embodiment shown in FIG. 1.

As shown in FIGS. 5 and 6, the male fastening tool body (sealing plug body) 2 has the annular concave part 27 formed between the body part 20 and the seat surface 22 of the flange part 21. As shown in FIG. 6, the annular concave part 27 has a main annular concave portion 28 extended from a boundary portion between the flange part 21 and the body part 20 toward the seat surface 22 of the flange part 21 and having an almost equal depth and the annular concave peripheral edge portion 29 which is formed between the main annular concave portion 28 and the seat surface 22 and becomes gradually shallower toward the seat surface 22. More specifically the annular concave part 27 has an annular inclined surface 27a extended from the inner edge 22a of the seat surface 22 toward the body part 20 and an upper surface of the flange part 21, an annular flat surface 27b which is extended from the termination point of the annular inclined surface 27a toward the body part 20 in approximately parallel with the seat surface 22, an annular curved surface 27c curvedly extended from the termination point of the annular flat surface 27b toward the body part 20, and an annular columnar surface 27d extended from the termination point of the annular curved surface 27c to the body part 20. The height (diameter) of the annular columnar surface 27d is set lower than a screw thread 23a of the body part 20 (smaller than the diameter of the screw thread) and higher than a thread groove 23b of the body part 20 (larger than the diameter of the thread groove). The annular columnar surface 27d crosses the flange part 21 and is extended to the body part 20. The annular columnar surface 27d is continuous with the neighborhood of the thread groove portion forming the termination of the male screw portion 23 of the body part 20. In the male fastening tool 1 of this embodiment, the outer edge of the lower surface of the flange part 21 is chamfered.

Figure 16:
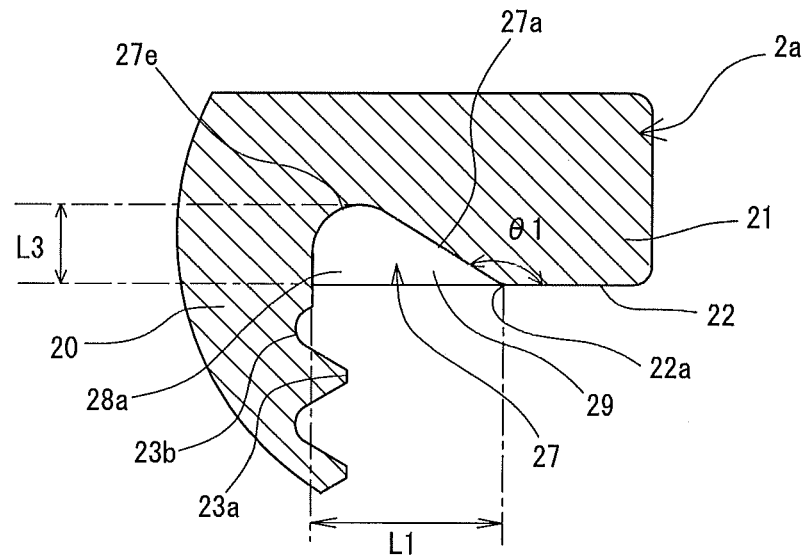
FIG. 16 is a partly enlarged sectional view of a male fastening tool body used for a male fastening tool of another embodiment of the present invention.

The male fastening tool body (sealing plug body) of the present invention may be of a type as shown in FIG. 16. A male fastening tool body (sealing plug body) 2a of this embodiment has the annular concave part 27 formed between the body part 20 and the seat surface 22 of the flange part 21. As shown in FIG. 16, the annular concave part 27 has a main annular concave portion 28a which is extended from the boundary portion between the flange part 21 and the body part 20 toward the seat surface 22 of the flange part 21 and has a circular-arc cross section and the annular concave peripheral edge portion 29 which is formed between the main annular concave portion 28 and the seat surface 22 and becomes gradually shallower toward the seat surface 22. More specifically the annular concave part 27 has the annular inclined surface 27a extended from the inner edge 22a of the seat surface 22 toward the body part 20 and the upper surface of the flange part 21 and an annular circular-arc surface 27e extended from the termination point of the annular inclined surface 27a toward the body part 20. The main annular concave portion 28a is formed at the annular circular-arc surface 27e. Unlike the above-described male fastening tool body 2, the male fastening tool body 2a does not have the main annular concave portion 28 having almost the equal depth.

Figure 17:
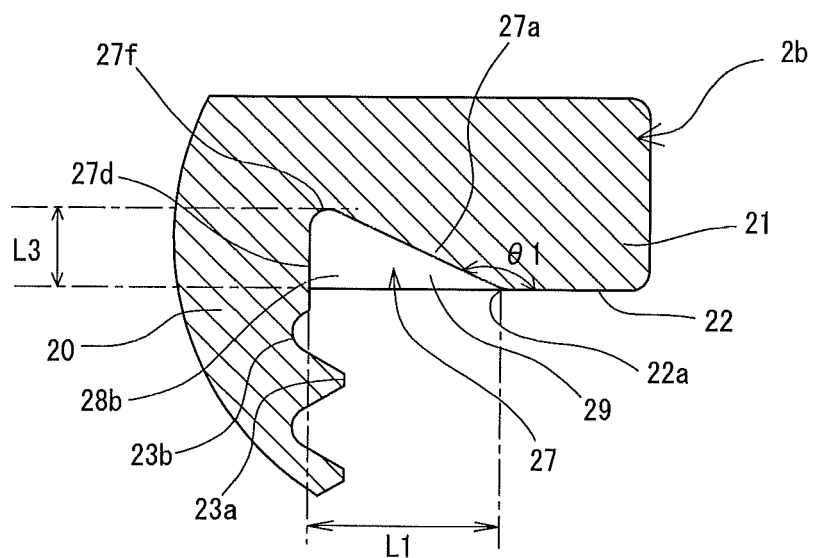
FIG. 17 is a partly enlarged sectional view of a male fastening tool body used for a male fastening tool of still another embodiment of the present invention.

The male fastening tool body (sealing plug body) of the present invention may be of a type as shown in FIG. 17. A male fastening tool body (sealing plug body) 2b of this embodiment has the annular concave part 27 formed between the body part 20 and the seat surface 22 of the flange part 21. As shown in FIG. 17, the annular concave part 27 has a main annular concave portion 28b which is extended from a boundary portion between the flange part 21 and the body part 20 toward the seat surface 22 of the flange part 21 and has a small circular-arc cross section and the annular concave peripheral edge portion 29 which is formed between the main annular concave portion 28b and the seat surface 22 and becomes gradually shallower toward the seat surface 22. More specifically, the annular concave part 27 has the annular inclined surface 27a extended from the inner edge 22a of the seat surface 22 toward the body part 20 and the upper surface of the flange part 21, a small annular circular-arc surface 27f extended from the termination point of the annular inclined surface 27a toward the body part 20, and the annular columnar surface 27d extended from the termination point of the annular circular-arc surface 27f to the body part 20. The main annular concave portion 28b is formed at the annular circular-arc surface 27f. Unlike the above-described male fastening tool body 2, the male fastening tool body 2b does not have the main annular concave portion 28 having almost the equal depth.

Figure 18:
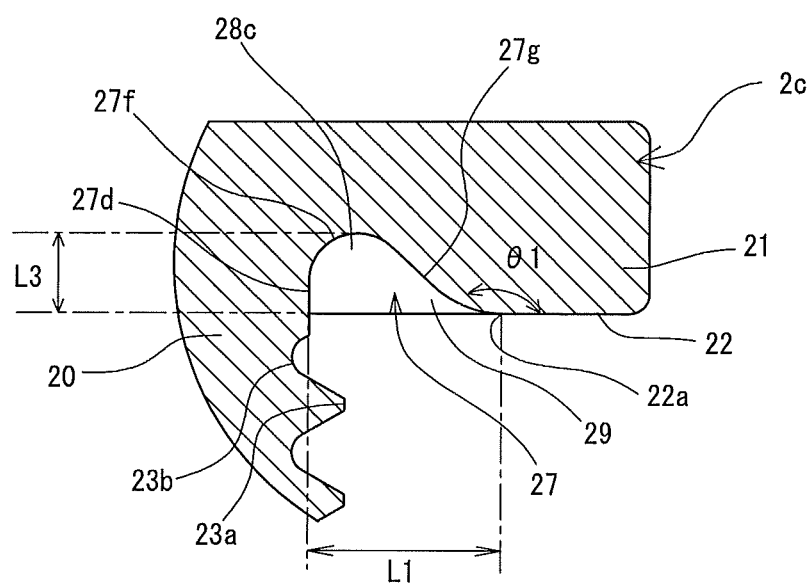
FIG. 18 is a partly enlarged sectional view of a male fastening tool body used for a male fastening tool of still another embodiment of the present invention.

The male fastening tool body (sealing plug body) of the present invention may be of a type as shown in FIG. 18. A male fastening tool body (sealing plug body) 2c of this embodiment has the annular concave part 27 formed between the body part 20 and the seat surface 22 of the flange part 21. As shown in FIG. 18, the annular concave part 27 has a main annular concave portion 28c extended from the boundary portion between the flange part 21 and the body part 20 toward the seat surface 22 of the flange part 21 and a small circular-arc cross section and the annular concave peripheral edge portion 29 which is formed between the main annular concave portion 28c and the seat surface 22 and becomes gradually shallower toward the seat surface 22. More specifically the annular concave part 27 has an annular curved surface 27g extended from the inner edge 22a of the seat surface 22 toward the body part 20 and the upper surface of the flange part 21, the annular circular-arc surface 27f extended from the termination point of the annular curved surface 27g toward the body part 20, and the annular columnar surface 27d extended from the termination point of the annular circular-arc surface 27f to the body part 20. The main annular concave portion 28c is formed at the annular circular-arc surface 27f. Unlike the above-described male fastening tool body 2, the male fastening tool body 2c does not have the main annular concave portion 28 having the almost the equal depth. The annular concave peripheral edge portion 29 is formed not as a tapered surface, but as a curved surface. As shown in FIG. 18, the annular curved surface 27g extended from the inner edge 22a of the seat surface 22 toward the body part 20 and the upper surface of the flange part 21 is formed as a curved surface having an inflection point in the neighborhood of its center. The annular curved surface 27g is formed as a curved surface projected to a low extent at the side of the inner edge 22a with respect to the inflection point and as a curved surface concave to a low extent at the side of the annular circular-arc surface 27f with respect to the inflection point.

An outer diameter D of the body part 20 is favorably 4 to 70 mm and especially favorably 5 to 50 mm. The length of the body part 20 is favorably 5 to 200 mm and especially favorably 6 to 100 mm. The outer diameter of the flange part 21 is favorably one to three times larger than the outer diameter D of the body part 20 and especially favorably 1.2 to 2.0 times larger than the outer diameter D thereof.

A width L1 (the distance between the inner edge 22a of the seat surface 22 and the body part 20, the distance between the inner edge 22a of the seat surface 22 and the annular columnar surface 27d of the annular concave part 27) of the annular concave part shown in FIG. 6 is favorably 0.05 to 0.8 times and especially favorably 0.1 to 0.6 times larger than the outer diameter D of the body part 20. A width L2 of the main annular concave portion 28 of the annular concave part 27 shown in FIG. 6 is favorably 0 to 0.3 times larger than the outer diameter D of the body part 20. A depth L3 of the annular concave part 27 is favorably 0.3 to 2.0 mm and especially favorably 0.5 to 1.5 mm. An angle θ1, shown in FIG. 6, formed between the annular inclined surface 27a forming the annular concave peripheral edge portion 29 of the annular concave part 27 and the seat surface 22 is favorably 120 degrees to 170 degrees and more favorably 130 degrees to 160 degrees.

Figure 7:
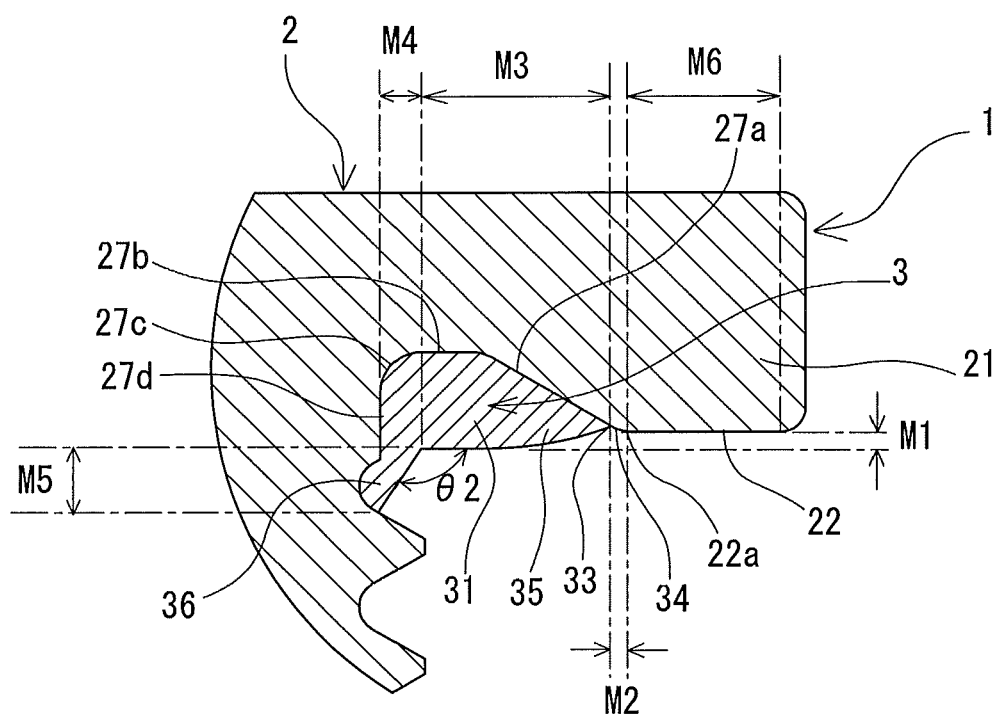
FIG. 7 is a partly enlarged sectional view of the male fastening tool body of the embodiment shown in FIG. 1.
Figure 8:
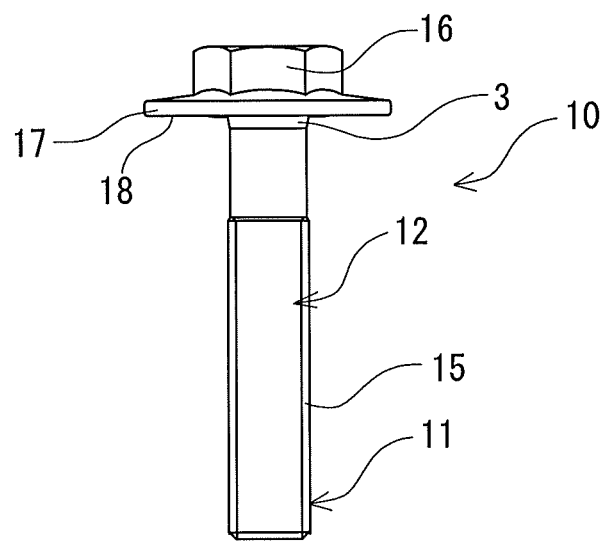
FIG. 8 is a front view of an embodiment in which the male fastening tool of the present invention is applied to a sealing bolt.
Figure 9:
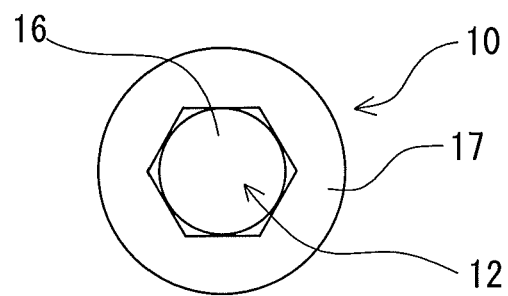
FIG. 9 is a plan view of the male fastening tool shown in FIG. 8.
Figure 10:
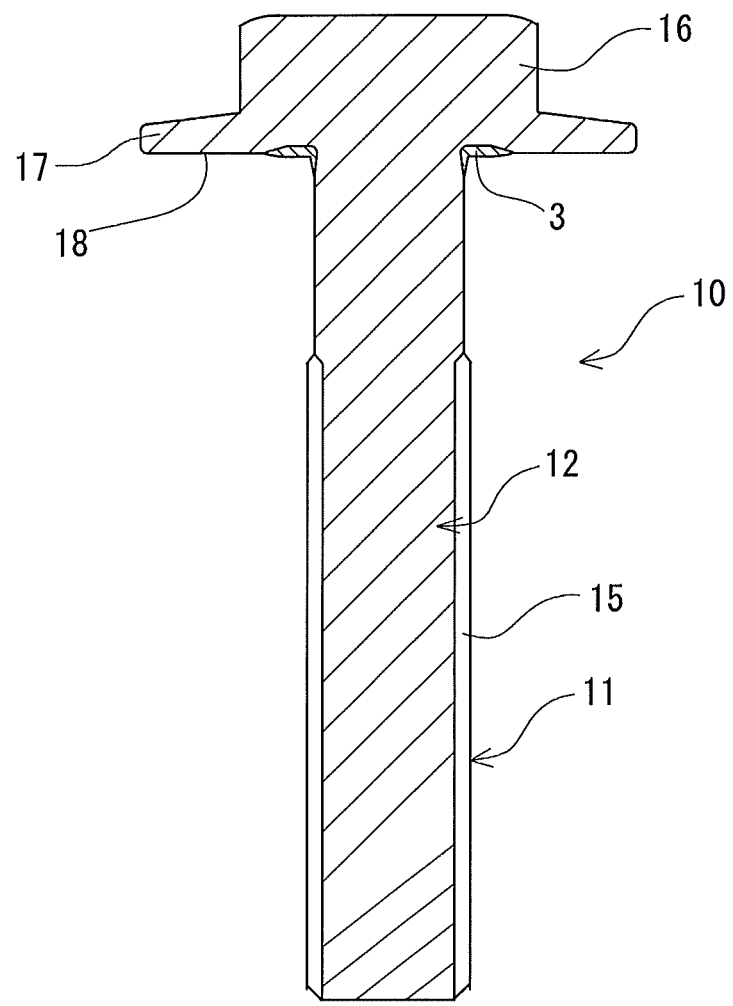
FIG. 10 is an enlarged vertical sectional view of FIG. 8.
Figure 11:
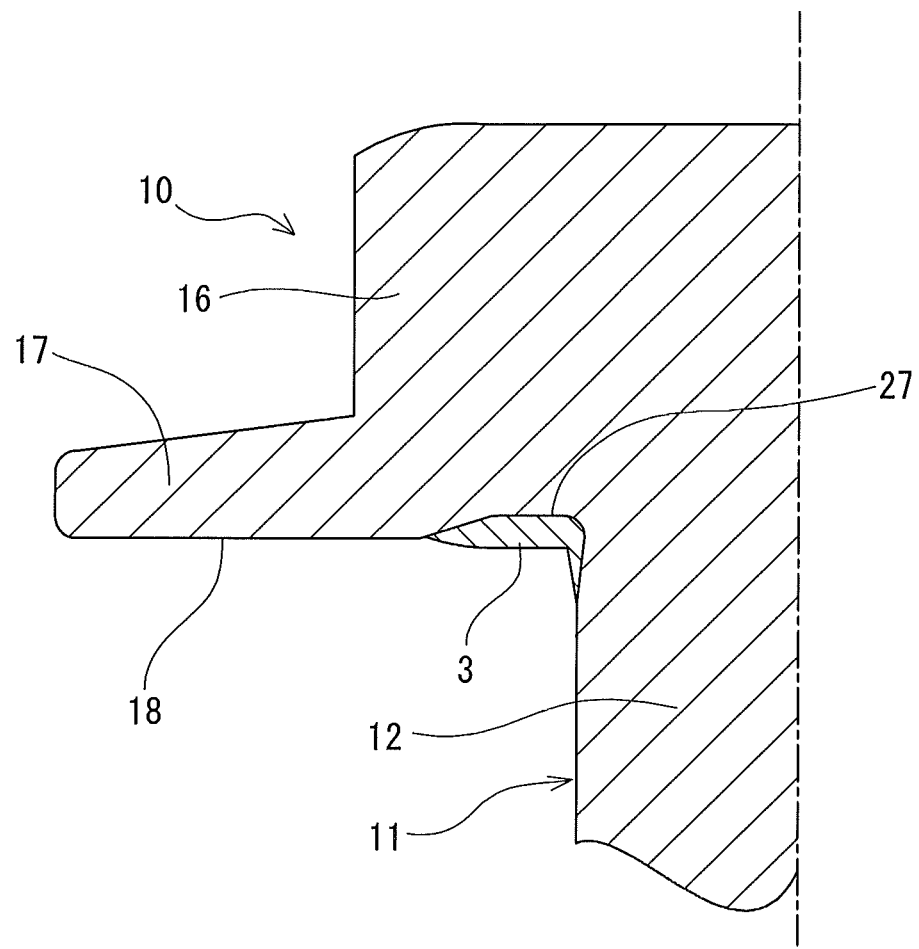
FIG. 11 is a partly enlarged sectional view of the male fastening tool of the embodiment shown in FIG. 8.
Figure 12:
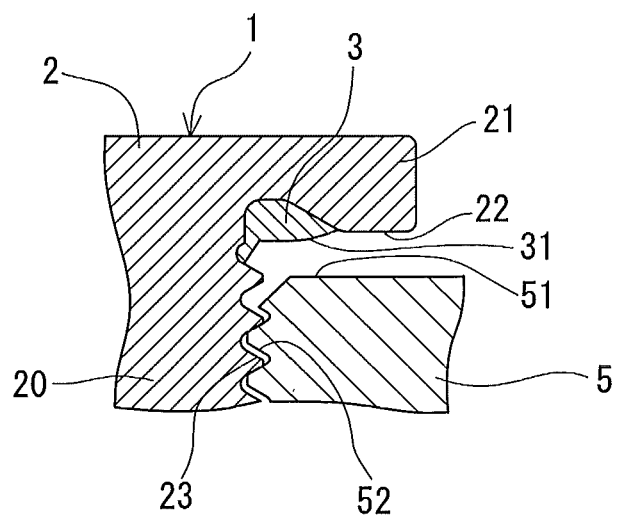
FIG. 12 is an explanatory view for explaining the action of the male fastening tool of the present invention.

Although an effective width M6 of the seat surface of the male fastening tool body (sealing plug body) 2 shown in FIG. 7 is different according to the diameter of the male fastening tool (in other words, the outer diameter of the body part 20), the effective width M6 is preferably 1.5 mm to 5 mm. Although the preferable area of the seat surface 22 is different according to the outer diameter of the body part 20, the area of the seat surface 22 is preferably 80 mm² to 300 mm².

In the male fastening tool (sealing plug) 1 of this embodiment, the male fastening tool body (sealing plug body) 2 has a tool-mounting hole 24 extended from the upper surface of the flange part 21 toward the body part 20. The tool-mounting hole 24 is extended from the center of the upper surface of the flange part 21 toward the body part 20 and penetrates through the flange part 21. A lower-end surface 24a of the tool-mounting hole 24 is disposed inside the body part 20. The tool-mounting hole 24 has a configuration corresponding to a tool to be used. In this embodiment, the inner surface of the tool-mounting hole 24 has the configuration of a regular polygonal prism (specifically, regular hexagonal prism). A peripheral edge 25 of the upper end of the tool-mounting hole 24 is formed as an annular tapered surface to facilitate insertion of the tool thereinto. The lower-end surface 24a of the tool-mounting hole 24 is tapered and becomes deeper toward the center thereof so that the front end of the inserted tool can be accommodated.

As shown in FIG. 7, the outer edge 33 of the resinous ring-shaped member 3 is located at the outer edge 22a (the inner edge of the seat surface 22) of the annular concave peripheral edge portion 29 of the annular concave part 27 or slightly toward the side of the body part 20 with respect to the outer edge 22a (the inner edge of the seat surface 22) of the annular concave peripheral edge portion 29. The resinous ring-shaped member 3 has the annular projected part 31 which fills almost the entire annular concave part 27 and the lower surface of which is projected downward beyond the seat surface 22 and the annular peripheral part 35, having the tapered bottom surface or the curved bottom surface, which is formed between the annular projected part 31 and the outer edge 33 of the resinous ring-shaped member 3 and becomes gradually thinner toward the outer edge 33.

In the resinous ring-shaped member 3 of this embodiment, as shown in FIG. 7, the lower surface of the annular projected part 31 projected downward beyond the seat surface 22 is formed as a flat surface extended toward the outer edge 33 of the resinous ring-shaped member 3 on the same level over a predetermined length. The lower surface of the annular projected part 31 may be formed as a curved surface.

In this embodiment, the annular peripheral part 35 of the resinous ring-shaped member 3 has the tapered bottom or the curved bottom surface formed between the annular projected part 31 and the outer edge 33 of the resinous ring-shaped member 3 and becomes gradually thinner toward the outer edge 33. The resinous ring-shaped member 3 is so formed that it does not reach the seat surface 22. Therefore in the male fastening tool 1, formed between the inner edge 22a of the seat surface 22 and the outer edge of the resinous ring-shaped member 3 is the annular concave part 34 having a sectional configuration of an approximately triangle whose vertex consists of the outer edge 33 of the resinous ring-shaped member 3. The outer edge 33 of the resinous ring-shaped member 3 may reach the inner edge of the seat surface 22, but is required not to be extended to the seat surface.

The outer diameter of the resinous ring-shaped member 3 is different according to the diameter of the male fastening tool (in other words, the outer diameter of the body part 20). The outer diameter of the resinous ring-shaped member 3 is favorably 0.5 to 2.5 times and especially favorably 0.8 to 2.0 times larger than the outer diameter D of the body part 20 of the male fastening tool. A projected height M1 of the annular projected part 31 shown in FIG. 7 with respect to the seat surface 22 is favorably 0.05 to 0.5 mm and especially favorably 0.1 to 0.4 mm. A distance M2 shown in FIG. 7 between the outer edge 33 of the resinous ring-shaped member 3 and the inner edge 22a of the seat surface 22 is favorably 0 to 0.7 mm and especially favorably 0.1 to 0.5 mm.

In the male fastening tool 1 of this embodiment, the resinous ring-shaped member 3 has a tapered inner-peripheral side projected part 36 which is extended from an inner peripheral portion of the annular projected part 31 toward the body part 20 with the diameter of the tapered inner-peripheral side projected part 36 decreasing. The tapered inner-peripheral side projected part 36 is extended in a predetermined length toward the lower end of the body part 20. The outer surface of the tapered inner-peripheral side projected part 36 is formed as an annular tapered surface which decreases in its diameter toward the lower end of the body part 20. An end of the tapered inner-peripheral side projected part 36 fills a thread groove forming the termination portion of the body part 20. An angle $\theta 2$, shown in FIG. 7, formed between the annular projected part 31 and the tapered inner-peripheral side projected part 36 is set to favorably 90 degrees to 180 degrees and especially favorably 120 degrees to 180 degrees. A distance M3 shown in FIG. 7 between the outer edge of the resinous ring-shaped member 3 and the outer edge of the tapered inner-peripheral side projected part 36 is set to preferably 0.1 to 0.6 times larger than the outer diameter D of the body part 20 of the male fastening tool. A distance M4 shown in FIG. 7 between the outer edge of the tapered inner-peripheral side projected part 36 and the annular columnar surface 27d of the annular concave part 27 is set to favorably 0 to 1.0 mm and especially favorably 0 to 0.8 mm. A length M5 of the tapered inner-peripheral side projected part 36 shown in FIG. 7 is set to favorably 0 to 3.0 mm and especially favorably 0.5 to 2.0 mm.

The resinous ring-shaped member 3 deforms when the male fastening tool 1 is mounted on the portion on which the male fastening tool 1 is to be mounted, does not restrain the seat surface 22 from being pressed against the portion on which the male fastening tool 1 is to be mounted, and forms an annular liquid-tight sealing portion for the portion on which the male fastening tool 1 is to be mounted.

Figure 13:
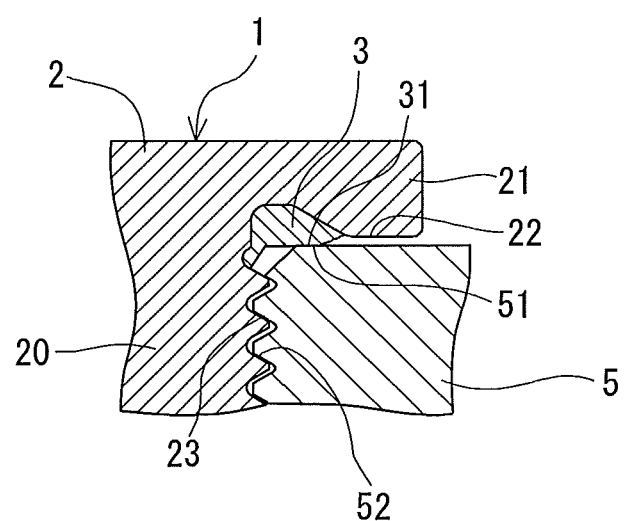
FIG. 13 is an explanatory view for explaining the action of the male fastening tool of the present invention.
Figure 14:
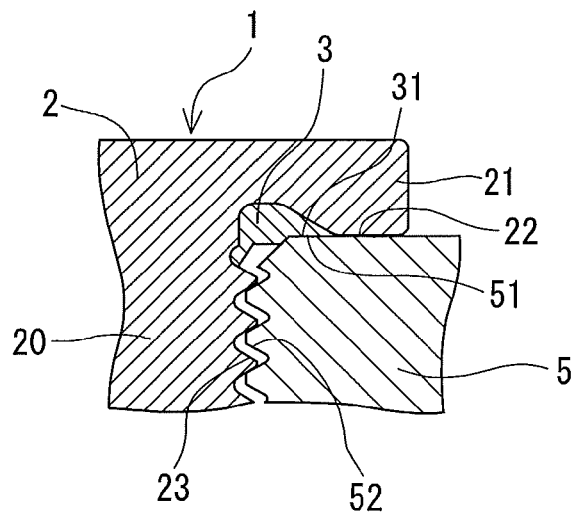
FIG. 14 is an explanatory view for explaining the action of the male fastening tool of the present invention.
Figure 15:
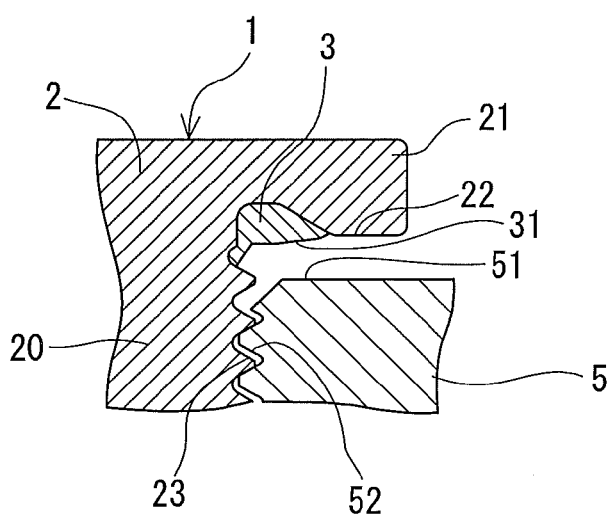
FIG. 15 is an explanatory view for explaining the action of the male fastening tool of the present invention.

More specifically as shown in FIGS. 12 through 15, the male fastening tool (sealing plug) 1 of the present invention is mounted on a portion (for example, parts of a car) of a metal molded product which requires liquid tightness. In an example shown in FIG. 12, a fixing hole having a female screw 52 is formed on a member 5 on which the sealing plug 1 is to be mounted. The sealing plug 1 of the present invention engages the female screw 52 of the member 5 on which the sealing plug 1 is to be mounted. As shown in FIG. 13, as the engagement proceeds, the resinous ring-shaped member 3 contacts a surface 51 of the 5 member on which the sealing plug 1 is to be mounted. As the engagement further proceeds, the resinous ring-shaped member 3 deforms as though it were crushed. More specifically, the resinous ring-shaped member 3 deforms not in an outer edge direction thereof, but pressed to the central direction thereof to form an annular liquid-tight sealing portion for the member 5 on which the sealing plug 1 is to be mounted. When the sealing plug 1 is fastened at a torque higher than a predetermined torque, the seat surface 22 of the sealing plug 1 is pressed against the surface 51 of the member 5 on which the sealing plug 1 is to be mounted. Thereby the mounting work finishes, as shown in FIG. 14. When the sealing plug 1 is loosened from the member on which the sealing plug 1 is to be mounted after the elapse of a predetermined period of time, the resinous ring-shaped member 3 is restorable to a configuration before it is compressed, although it does not completely return to the configuration before it is compressed. Therefore in fastening the sealing plug 1 again to the member 5 on which the sealing plug 1 is to be mounted, the resinous ring-shaped member 3 forms the annular liquid-tight sealing portion for the portion 5 on which the sealing plug 1 is to be mounted.

It is desirable that the resinous ring-shaped member 3 is formed on the male fastening tool body (sealing plug body) 2 by insert molding. Therefore as the material forming the resinous ring-shaped member 3, thermoplastic resins which can be insert-molded are used. The insert molding herein means that after the formed male fastening tool body (sealing plug body) is inserted into a die, the resinous ring-shaped member is formed by injection of a molten resin. It is preferable that resin to be used contracts a little when it is cooled. By using and insert-molding such a resin, i.e., by using the cooling-caused contraction of the resin forming the resinous ring-shaped member 3, the resinous ring-shaped member can be fixed to the male fastening tool body (sealing plug body). Owing to the cooling-caused contraction of the resinous ring-shaped member, the inner diameter thereof contracts in a diameter decrease direction. Thereby the resinous ring-shaped member which preferably adheres to the male fastening tool body (sealing plug body) is formed. In other words, owing to the deformation (compression) of the resinous ring-shaped member, a crimped state in which the resinous ring-shaped member has adhered to the male fastening tool body (sealing plug body) is formed.

The material forming the resinous ring-shaped member 3 has a flexural modulus of elasticity of favorably 200 to 3000 MPa and especially favorably 500 to 2500 MPa and a tensile elongation after fracture of favorably 5 to 300% and especially favorably 15 to 200%.

As examples of materials forming the resinous ring-shaped member 3, it is possible to use synthetic rubber such as urethane rubber, silicone rubber, butadiene rubber, propylene rubber; natural rubber such as latex rubber; and elastomers such as olefin elastomers (polyethylene elastomer, polypropylene elastomer); amide elastomers (polyamide elastomer); styrene elastomers (for example, styrene-butadiene-styrene copolymer, styrene-isoprene-styrene copolymer, styrene-ethylene butylene-styrene copolymer); urethane elastomers (polyurethane elastomer of polyester family, polyurethane elastomer of polyether family).

As other examples of materials forming the resinous ring-shaped member 3, it is possible to use polyacetal, polycarbonate, polyester (polyethylene terephthalate, polybutylene terephthalate), polyolefin (polyethylene, polypropylene, ethylene-propylene copolymer), polyamide (nylon 6, nylon 66, modified nylon), polysulfone, polyarylate, polyphenylene ether, polyphenylene sulfide, polyetherimide, and blend polymers or polymer alloys of these substances.

The male fastening tool of the present invention is not limited to the above-described sealing plug, but may be applied to a sealing bolt shown in FIGS. 8 through 11.

A sealing bolt 10 of this embodiment is different from the sealing plug 1 in that the body of the male fastening tool is not the body of the sealing plug, but is the body of the sealing bolt. The form of the annular concave part of the sealing bolt 10 and that of the resinous ring-shaped member thereof are the same as those of the above-described sealing plug 1.

The sealing bolt 10 of this embodiment is composed of a sealing bolt body 11 essentially having a body part 12 having a male screw portion 15, a flange part 17 which is formed on the upper end of the body part 12 and has a seat surface 18, to be pressed against a portion on which the sealing bolt 10 is to be mounted, which is disposed on the periphery of the lower surface thereof, and the annular concave part 27 formed between the body part 12 and the seat surface 18 of the flange part 17; and the resinous ring-shaped member 3 disposed at the annular concave part 27 of the sealing bolt body 11. The annular concave part 27 of the sealing bolt body 11 has a main annular concave portion extended from a boundary portion disposed between the flange part 17 and the body part 12 toward the seat surface 18 of the flange part 17 and having an almost equal depth and an annular concave peripheral edge portion which is formed between the main annular concave portion and the seat surface 18 and becomes gradually shallower toward the seat surface. The resinous ring-shaped member 3 is located slightly toward the side of the body part 12 with respect to the outer edge of the annular concave peripheral edge portion of the annular concave part 27. The resinous ring-shaped member 3 has an annular projected part (annular main part) which fills almost the entire annular concave part 27 and a lower surface of which is projected downward beyond the seat surface and an annular peripheral part, having a tapered bottom surface or a curved bottom surface, which is formed between the annular projected part and the outer edge of the resinous ring-shaped member 3 and becomes gradually thinner. In the sealing bolt 10 of this embodiment, formed between an inner edge of the seat surface 18 and the outer edge of the resinous ring-shaped member 3 is the annular concave part having a sectional configuration of an approximately triangle whose vertex consists of the outer edge of the resinous ring-shaped member 3. The resinous ring-shaped member 3 deforms when the resinous ring-shaped member 3 is mounted on the portion on which the sealing bolt 10 is to be mounted, does not restrain the seat surface 18 from being pressed against the portion on which the sealing bolt 10 is to be mounted, and forms an annular liquid-tight sealing portion for the portion on which the sealing bolt 10 is to be mounted.

FIGS. 8 through 11 show an embodiment in which the male fastening tool of the present invention is applied to the sealing bolt.

The male fastening tool (sealing bolt) 10 of this embodiment is composed of the male fastening tool body (sealing bolt body) 11 and the resinous ring-shaped member 3 disposed at the annular concave part 27 of the male fastening tool body (sealing bolt body) 11. The sealing bolt of this embodiment displays a sealing effect as soon as a fastening work finishes. The sealing bolt is capable of holding an axial force as much as ordinary sealing bolts do and displaying the sealing effect at a low torque (axial force). Further the sealing bolt 10 eliminates the need for incorporating a washer, an O-ring, and the like in the male fastening tool body. Thus the use of the male fastening tool facilitates a fastening work.

The sealing bolt body 11 is made of an iron-based steel material such as high-tensile strength steel or stainless steel. As shown in FIGS. 8 through 11, the sealing bolt body 11 has the body part 12 having the male screw portion 15, the flange part 17 formed on the upper end of the body part 12, and a head part 16 formed on the upper end of the flange part 17. The male screw is formed on the body part 12 entirely or at a portion of the outer surface thereof. In this embodiment, the head part 16 is formed on the upper end of the flange part 17. The head part 16 is so formed that it has an outer diameter larger than that of the body part 11 and a polygonal configuration to allow a rotational operation to be performed with a wrench or the like.

The flange part 17 is formed on the lower end of the head part 16 and has an outer diameter larger than that of the head part 16. The flange part 17 has a disk-shaped body portion and the seat surface 18 composed of a lower surface of the body portion of the flange part 17. The seat surface 18 is formed as a flat portion and capable of holding a predetermined axial force when the male sealing bolt 10 is mounted on the portion on which the sealing bolt 10 is to be mounted. In the male sealing bolt 10 of this embodiment, the diameter of the upper surface of the flange part formed as a tapered portion becomes smaller toward the head part 16.

It is preferable that in the sealing bolt 10 of this embodiment, the form of the annular concave part and that of the resinous ring-shaped member are the same as those of the male fastening tool of the above-described embodiment.

EXAMPLES

Example 1

Using steel, a sealing plug body having a flange part whose diameter was ϕ33.5 mm and thickness was 3.5 mm, a body part, having a diameter of ϕ24 mm, which had a male screw having a length of 7.5 mm, and an annular concave part having a configuration shown in FIGS. 1 through 7 was prepared.

The width L1 (the distance between the inner edge 22a of the seat surface 22 and the body part 20, the distance between the inner edge 22a of the seat surface 22 and the annular columnar surface 27d of the annular concave part 27) of the annular concave part of the prepared sealing plug body shown in FIG. 6 was 3.75 mm. The width L2 of the main annular concave portion 28 of the annular concave part 27 shown in FIG. 6 was 1.5 mm. The depth L3 of the annular concave part 27 shown in FIG. 6 was 1.0 mm. The angle θ1, shown in FIG. 6, which was formed between the annular inclined surface 27a forming the annular concave peripheral edge portion 29 of the annular concave part 27 and the seat surface 22 was 150 degrees. The effective width M6 of the seat surface 22 shown in FIG. 7 was 1.87 mm.

The sealing plug which is the male fastening tool of the present invention was prepared by inserting the prepared sealing plug body into a die, injecting molten resin (PPE: polyphenylene ether) thereinto, and forming the resinous ring-shaped member having a form as shown in FIGS. 1 through 7 in the annular concave part of the sealing plug body.

The projected height M1 of the resinous ring-shaped member 3 of the prepared sealing plug shown in FIG. 7 with respect to the seat surface 22 was 0.25 mm. The distance M2 shown in FIG. 7 between the outer edge 33 of the resinous ring-shaped member 3 and the inner edge 22a of the seat surface 22 was 0.15 mm. The distance M3 shown in FIG. 7 between the outer edge of the resinous ring-shaped member 3 and the outer edge of the tapered inner-peripheral side projected part 36 was 2.38 mm. The distance M4 shown in FIG. 7 between the outer edge of the tapered inner-peripheral side projected part 36 and the annular columnar surface 27d of the annular concave part 27 was 0.5 mm. The length M5 of the tapered inner-peripheral side projected part 36 shown in FIG. 7 was 1.0 mm. The angle θ2, shown in FIG. 7, which was formed between the annular projected part 31 and the tapered inner-peripheral side projected part 36 was 125 degrees.

Example 2

Using steel, a sealing plug body having a flange part whose diameter was ϕ19 mm and thickness was 3 mm, a body part, having a diameter of ϕ10 mm, which had a male screw having a length of 11 mm, and an annular concave part having a configuration shown in FIGS. 1 through 7 was prepared.

The width L1 (the distance between the inner edge 22a of the seat surface 22 and the body part 20, the distance between the inner edge 22a of the seat surface 22 and the annular columnar surface 27d of the annular concave part 27) of the annular concave part of the prepared sealing plug body shown in FIG. 6 was 3.12 mm. The width L2 of the main annular concave portion 28 of the annular concave part 27 shown in FIG. 6 was 1.58 mm. The depth L3 of the annular concave part 27 shown in FIG. 6 was 1.0 mm. The angle θ1, shown in FIG. 6, which was formed between the annular inclined surface 27a forming the annular concave peripheral edge portion 29 of the annular concave part 27 and the seat surface 22 was 135 degrees. The effective width M6 of the seat surface 22 shown in FIG. 7 was 1.88 mm.

The sealing plug which is the male fastening tool of the present invention was prepared by inserting the prepared sealing plug body into the die, injecting molten resin (PPE: polyphenylene ether) thereinto, and forming the resinous ring-shaped member having the form as shown in FIGS. 1 through 7 in the annular concave part of the sealing plug body.

The projected height M1 of the resinous ring-shaped member 3 of the prepared sealing plug shown in FIG. 7 with respect to the seat surface 22 was 0.25 mm. The distance M2 shown in FIG. 7 between the outer edge 33 of the resinous ring-shaped member 3 and the inner edge 22a of the seat surface 22 was 0.25 mm. The distance M3 shown in FIG. 7 between the outer edge of the resinous ring-shaped member 3 and the outer edge of the tapered inner-peripheral side projected part 36 was 2.66 mm. The distance M4 shown in FIG. 7 between the outer edge of the tapered inner-peripheral side projected part 36 and the annular columnar surface 27d of the annular concave part 27 was 0.25 mm. The length M5 of the tapered inner-peripheral side projected part 36 shown in FIG. 7 was 1.5 mm. The angle θ2, shown in FIG. 7, which was formed between the annular projected part 31 and the tapered inner-peripheral side projected part 36 was 102 degrees.

Example 3

Using steel, a sealing bolt body having a flange part whose diameter was ϕ14.5 mm and thickness was 1.5 mm, a body part, having a diameter of ϕ6 mm, which had a male screw having a length of 35 mm, and an annular concave part having a configuration shown in FIGS. 8 through 11 was prepared.

The width L1 (the distance between the inner edge 22a of the seat surface 22 and the body part 20, the distance between the inner edge 22a of the seat surface 22 and an annular columnar surface 27d of the annular concave part 27) of the annular concave part of the prepared sealing bolt body shown in FIG. 6 was 2.96 mm. The width L2 of the main annular concave portion 28 of the annular concave part 27 was 0.82 mm. The depth L3 of the annular concave part 27 was 0.9 mm. The angle θ1, shown in FIG. 6, which was formed between the annular inclined surface 27a forming the annular concave peripheral edge portion 29 of the annular concave part 27 and the seat surface 22 was 138 degrees. The effective width M6 of the seat surface 22 shown in FIG. 7 was 2.25 mm.

The sealing bolt which is the male fastening tool of the present invention was prepared by inserting the prepared sealing plug body into the die, injecting the molten resin (PPE: polyphenylene ether) thereinto, and forming the resinous ring-shaped member in the annular concave part of the sealing bolt body.

The projected height M1 of the resinous ring-shaped member 3 of the prepared sealing plug shown in FIG. 7 with respect to the seat surface 22 was 0.25. The distance M2 shown in FIG. 7 between the outer edge 33 of the resinous ring-shaped member 3 and the inner edge 22a of the seat surface 22 was 0 mm. The distance M3 shown in FIG. 7 between the outer edge of the resinous ring-shaped member 3 and the outer edge of the tapered inner-peripheral side projected part 36 was 2.47 mm. The distance M4 shown in FIG. 7 between the outer edge of the tapered inner-peripheral side projected part 36 and the annular columnar surface 27d of the annular concave part 27 was 0.46 mm. The length M5 of the tapered inner-peripheral side projected part 36 shown in FIG. 7 was 0 mm. The angle θ2, shown in FIG. 7, which was formed between the annular projected part 31 and the tapered inner-peripheral side projected part 36 was 180 degrees.

Comparison Example 1

The sealing plug body of example 1 (did not have the resinous ring-shaped member) was used as the sealing plug of the comparison example 1.

Comparison Example 2

The sealing plug body of example 1 (did not have the resinous ring-shaped member) having a copper washer mounted thereon was used as the sealing plug of the comparison example 2.

Comparison Example 3

The sealing plug body of example 1 (did not have the resinous ring-shaped member) having an aluminum washer mounted thereon was used as the sealing plug of the comparison example 3.

Comparison Example 4

The sealing plug body of example 1 (did not have the resinous ring-shaped member) having a stainless steel (SUS) washer mounted thereon was used as the sealing plug of the comparison example 4.

Comparison Example 5

The sealing bolt body of example 3 (did not have the resinous ring-shaped member) was used as the sealing bolt of the comparison example 5.

Comparison Example 6

The sealing bolt body of example 3 (did not have the resinous ring-shaped member) having the copper washer mounted thereon was used as the sealing bolt of the comparison example 6.

Comparison Example 7

The sealing bolt body of example 3 (did not have the resinous ring-shaped member) having the aluminum washer mounted thereon was used as the sealing bolt of the comparison example 7.

Comparison Example 8

The sealing bolt body of example 3 (did not have the resinous ring-shaped member) having the stainless steel (SUS) washer mounted thereon was used as the sealing bolt of the comparison example 8.

Experiment 1

Experiments for measuring the axial force-holding properties of the sealing plugs of the example 1 and the comparison examples 1 through 4 were conducted.

A plurality of the sealing plugs of the example 1 and the comparison examples 1 through 4 was prepared. Each of the sealing plugs was mounted on a seat surface plate made of iron by setting the length between clamped points of each sealing plug to 2 mm and the axial force to 800 kgf (computed from the elongated length of the sealing plug).

After seat surface plates on which the sealing plugs were mounted respectively were left for 100 hours in respective high-temperature baths set to various temperatures, the seat surface plates were taken out. After the temperatures of the sealing plugs and those of the seat surface plates became normal, the residual elongation amount of each of the sealing plugs was measured to compute the residual axial force thereof. The results are as shown below.

1) Temperature of High-Temperature Bath (60 Degrees C.)
    Example 1 797 kgf
    Comparison example 1 797 kgf
    Comparison example 2 794 kgf
    Comparison example 3 792 kgf
    Comparison example 4 791 kgf
2) Temperature of High-Temperature Bath (80 Degrees C.).
    Example 1 786 kgf
    Comparison example 1 794 kgf
    Comparison example 2 791 kgf
    Comparison example 3 784 kgf
    Comparison example 4 781 kgf
3) Temperature of High-Temperature Bath (120 Degrees C.).
    Example 789 kgf
    Comparison example 1 788 kgf
    Comparison example 2 763 kgf
    Comparison example 3 756 kgf
    Comparison example 4 797 kgf
4) Temperature of High-Temperature Bath (150 Degrees C.).
    Example 1 794 kgf
    Comparison example 1 791 kgf
    Comparison example 2 758 kgf
    Comparison example 3 719 kgf
    Comparison example 4 792 kgf Experiment 2

Experiments for measuring the sealing properties of the sealing plugs of the example 1 and the comparison examples 1 through 4 were conducted.

Using a leak-examining jig made of stainless steel which had a plug-mounting hole having a female screw formed on its inner surface and an air path communicating with the plug-mounting hole, each sealing plug was mounted on the leak-examining jig at a clamping torque of 10 to 60 N·m. After an air pressure (1 MPa) was applied to the air path of the leak-examining jig, the leak-examining jig was immersed in water. Whether air leaked from the vicinity of the flange of each sealing plug was visually checked 10 minutes later.
1) Clamping Torque 10 N m, 20 N m
    Air leak was found on the sealing bolts of all of the example 1 and the comparison examples 1 through 4.
2) Clamping Torque 30 N m
    Air leak was not found on the sealing bolt of the example 1, but found on the sealing bolts of the comparison examples 1 through 4.
3) Clamping Torque 40 N m
    Air leak was not found on the sealing bolts of the example 1 and the comparison example 2, but found on the sealing bolts of the comparison examples 1, 3, and 4.
4) Clamping Torque 50 N m
    Air leak was not found on the sealing bolts of the example 1 and the comparison examples 2 and 3, but found on the sealing bolts of the comparison examples 1 and 4.

5) Clamping Torque 60 N m

Air leak was not found on the sealing bolts of the example 1 and the comparison examples 2 through 4, but found on the sealing bolt of the comparison example 1.

Experiment 3

Experiments for measuring the axial force-holding properties of the sealing bolts of the example 3 and the comparison examples 5 through 8 were conducted.

A plurality of the sealing bolts of the example 3 and the comparison examples 5 through 8 was prepared. Each of the sealing bolts was mounted on a seat surface plate made of iron by setting the length between clamped points of each sealing bolt to 25 mm and the axial force to 800 kgf (computed from the elongated length of the sealing bolt).

After seat surface plates on which the sealing plugs were mounted respectively were left for 100 hours in respective high-temperature baths set to various temperatures, the seat surface plates were taken out. After the temperatures of the sealing plugs and those of the seat surface plates became normal, the residual elongation amount of each of the sealing plugs was measured to compute the residual axial force thereof. The results are as shown below.

1) Temperature of High-Temperature Bath (60 Degrees C.).
   Example 3 792 kgf
   Comparison example 5 790 kgf
   Comparison example 6 792 kgf
   Comparison example 7 790 kgf
   Comparison example 8 791 kgf
2) Temperature of High-Temperature Bath (80 Degrees C.).
   Example 3 791 kgf
   Comparison example 5 787 kgf
   Comparison example 6 785 kgf
   Comparison example 7 764 kgf
   Comparison example 8 791 kgf
3) Temperature of High-Temperature Bath (120 Degrees C.).
   Example 3 790 kgf
   Comparison example 5 790 kgf
   Comparison example 6 777 kgf
   Comparison example 7 744 kgf
   Comparison example 8 798 kgf
4) Temperature of High-Temperature Bath (150 Degrees C.).
   Example 3 791 kgf
   Comparison example 5 795 kgf
   Comparison example 6 780 kgf
   Comparison example 7 730 kgf
   Comparison example 8 795 kgf Experiment 4

Experiments for measuring the sealing properties of the sealing bolts of the example 3 and the comparison examples 5 through 8 were conducted.

Using a leak-examining jig made of stainless steel having a bolt-mounting hole having a female screw formed on its inner surface and an air path communicating with the bolt-mounting hole, each sealing bolt was mounted on the leak-examining jig at a clamping torque of 1 to 9 N m. After an air pressure (1 MPa) was applied to the air path of the leak-examining jig, the leak-examining jig was immersed in water. Whether air leaked from the vicinity of the flange of each sealing bolt was visually checked 10 minutes later.

1) Clamping Torque 1 N m, 2 N m, 3 N m

Air leak was found on the sealing bolts of the example 3 and the comparison examples 5 through 8.

2) Clamping Torque N m

Air leak was not found on the sealing bolt of the example 3, but found on the sealing bolts of the comparison examples 5 through 8.

3) Clamping Torque 5 N m

Air leak was not found on the sealing bolt of the example 3, but found on the sealing bolts of the comparison examples 5 through 8.

4) Clamping Torque 6 N m

Air leak was not found on the sealing bolts of the example 3 and the comparison example 6, but found on the sealing bolts of the comparison examples 5, 7, and 8.

5) Clamping Torque 7 N m, 8 N m, 9 N m

Air leak was not found on the sealing bolts of the example 3 and the comparison examples 6 and 7, but found on the sealing bolts of the comparison examples 5 and 8.

The male fastening tool of the present invention is composed of the male fastening tool body essentially including the body part having the male screw portion formed thereon, the flange part which is formed on the upper end of the body part and has the seat surface, to be pressed against the portion on which the male fastening tool is to be mounted, which is disposed on the periphery of the lower surface thereof, and the annular concave part formed between the body part and the seat surface of the flange part; and the resinous ring-shaped member disposed at the annular concave part of the male fastening tool body. The annular concave part of the male fastening tool body further includes the annular concave peripheral edge portion which becomes gradually shallower toward the seat surface. The outer edge of the resinous ring-shaped member is located at the outer edge of the annular concave peripheral edge portion of the annular concave part or slightly toward the side of the body part with respect to the outer edge of the annular concave peripheral edge portion. The resinous ring-shaped member has the annular projected part which fills almost the entirety of the annular concave part and the lower surface of which is projected downward beyond the seat surface and the annular peripheral part, having the tapered bottom surface or the curved bottom surface, which is formed between the annular projected part and the outer edge of the resinous ring-shaped member and becomes gradually thinner. The resinous ring-shaped member deforms when the male fastening tool is mounted on the portion on which the male fastening tool is to be mounted, does not restrain the seat surface from being pressed against the portion on which the male fastening tool is to be mounted, and forms the annular liquid-tight sealing portion for the portion on which the male fastening tool is to be mounted.

Therefore when the male fastening tool of the present invention is mounted on the portion to which a member is fastened by tightening the male fastening tool, the male fastening tool is capable of securely liquid-tightly sealing the above-described portion, and the axial force can be held by the seat surface of the flange part of the male fastening tool body. Further the resinous ring-shaped member fixed to the male fastening tool body to seal the portion does not cause the male fastening tool to be very large.

What is claimed is:

1. A male fastening tool to be used to fasten a member comprising:

a male fastening tool body including a body part having a male screw portion formed thereon, a flange part which is formed on an upper end of said body part and has a seat surface disposed on a periphery of a lower surface thereof, and an annular concave part formed between said body part and said seat surface of said flange part; and a resinous ring-shaped member disposed at said annular concave part of said male fastening tool body,
wherein said annular concave part of said male fastening tool body comprises a main annular concave portion extended from a boundary portion between the flange part and the body part toward the seat surface of the flange part and an annular concave peripheral edge portion which is formed between said main annular concave portion and said seat surface and becomes gradually shallower toward said seat surface;
said resinous ring-shaped member fills almost an entirety of said annular concave part and has a surface shape corresponding to said annular concave part, said resinous ring-shaped member being adhered to said annular concave part;
said resinous ring-shaped member including, before said resinous ring-shaped member is deformed when said male fastening tool is mounted on said member: i) an annular main part possessing a lower surface projecting downward beyond said seat surface; ii) an annular peripheral part having a tapered bottom surface or a curved bottom surface, which is formed between said annular main part and said outer edge of said resinous ring-shaped member and becomes gradually thinner; and iii) a tapered inner-peripheral side projected part which extends from an inner peripheral portion of said annular main part towards said body part of said male fastening tool body with a diameter of said tapered inner-peripheral side projected part decreasing in the direction away from said annular main part, wherein said tapered inner-peripheral side projected part is in close contact with said annular columnar part of said male fastening tool body;
said annular concave peripheral edge portion of said tool body has an annular inclined surface,
said resinous ring-shaped member has an upper annular inclined surface to be in close contact with said annular inclined surface of said male fastening tool body and said lower surface projecting downward beyond said seat surface,
said resinous ring-shaped member can be deformed not in an outer edge direction thereof, but pressed to a central direction, when said resinous ring-shaped member is pressed from said lower surface side; and
wherein said outer edge of said resinous ring-shaped member is not extended to said seat surface and said male fastening tool has an annular concave part formed between an inner edge of said seat surface and said outer edge of said resinous ring-shaped member.

2. A male fastening tool according to claim 1, wherein an angle formed between said annular inclined surface of said annular concave part and said seat surface is 130 degrees to 160 degrees.

3. A male fastening tool according to claim 1, wherein said main annular concave portion has a depth almost equal to a depth between said boundary portion between said flange plate and said body part towards said seat surface of said flange part.

4. A male fastening tool according to claim 1, wherein a lower surface of said annular main part is formed as a flat surface.

5. A male fastening tool according to claim 1, wherein a lower surface of said annular main part of said resinous ring-shaped member is formed as a curved surface.

6. A male fastening tool according to claim 1, wherein said male fastening tool is a sealing plug having a tool-mounting hole extended from an upper surface of said flange part toward said body part.

7. A male fastening tool according to claim 1, wherein said male fastening tool is a sealing bolt having a head part formed on an upper portion of said flange part.

8. A male fastening tool according to claim 1, wherein said resinous ring-shaped member is formed on said male fastening tool body by insert molding.

9. A male fastening tool according to claim 1, wherein said resinous ring-shaped member is made of resin having a flexural modulus of elasticity of 800 to 3000 MPa and a tensile elongation after fracture of 10 to 200%.

10. A male fastening tool according to claim 1, wherein said resinous ring-shaped member is formed on said male fastening tool body by insert molding and fixed to said male fastening tool body owing to contraction of resin forming said male fastening tool when said resin is cooled.

11. A male fastening tool according to claim 1, wherein a projected height of the annular main part with respect to said seat surface is 0.1 to 0.4 mm.

12. A male fastening tool according to claim 1, wherein said resinous ring-shaped member deforms when said male fastening tool is mounted on said member, does not restrain said seat surface from being pressed against said member on which said male fastening tool is to be mounted, and forms an annular liquid-tight sealing portion for said member on which said male fastening tool is to be mounted.

13. A male fastening tool to be used to fasten a member comprising:
a male fastening tool body including a body part having a male screw portion formed thereon, a flange part which is formed on an upper end of said body part and has a seat surface disposed on a periphery of a lower surface thereof, and an annular concave part formed between said body part and said seat surface of said flange part; and
a resinous ring-shaped member disposed at said annular concave part of said male fastening tool body,
wherein said annular concave part of said male fastening tool body comprises a main annular concave portion extended from a boundary portion between the flange part and the body part toward the seat surface of the flange part and an annular concave peripheral edge portion which is formed between said main annular concave portion and said seat surface and becomes gradually shallower toward said seat surface;
said resinous ring-shaped member fills almost an entirety of said annular concave part and has a surface shape corresponding to said annular concave part, said resinous ring-shaped member being adhered to said annular concave part;
said resinous ring-shaped member including, before said resinous ring-shaped member is deformed when said male fastening tool is mounted on said member: i) an annular main part possessing a lower surface projecting downward beyond said seat surface; ii) an annular peripheral part having a tapered bottom surface or a curved bottom surface, which is formed between said annular main part and said outer edge of said resinous ring-shaped member and becomes gradually thinner; and iii) a tapered inner-peripheral side projected part which extends from an inner peripheral portion of said annular main part towards said body part of said male fastening tool body with a diameter of said tapered inner-peripheral side projected part decreasing in the direction away from said annular main part, wherein said tapered inner-peripheral side projected part is in close contact with said annular columnar part of said male fastening tool body;

said annular concave peripheral edge portion of said tool body has an annular inclined surface, said resinous ring-shaped member has an upper annular inclined surface to be in close contact with said annular inclined surface of said male fastening tool body and said lower surface projecting downward beyond said seat surface, said resinous ring-shaped member can be deformed not in an outer edge direction thereof, but pressed to a central direction, when said resinous ring-shaped member is pressed from said lower surface side; and wherein said outer edge of said resinous ring-shaped member is located slightly toward a side of said body part with respect to said outer edge of said annular concave peripheral edge portion and said male fastening tool comprises an annular concave part formed between an inner edge of said seat surface and said outer edge of said resinous ring-shaped member.

\* \* \* \* \*